(12) United States Patent
Jiang

(10) Patent No.: US 10,281,695 B2
(45) Date of Patent: May 7, 2019

(54) OPTICAL SYSTEM OF LED VARIABLE-FOCUS IMAGING LAMP

(71) Applicants: Guangzhou Haoyang Electronic Co., Ltd., Guangzhou (CN); Weikai Jiang, Guangzhou (CN)

(72) Inventor: Weikai Jiang, Guangzhou (CN)

(73) Assignee: Guangzhou Haoyang Electronic Co., Ltd., Guangzhou, Guangdong (CN)

( * ) Notice: Subject to any disclaimer, the term of this patent is extended or adjusted under 35 U.S.C. 154(b) by 438 days.

(21) Appl. No.: 15/036,884

(22) PCT Filed: Oct. 24, 2014

(86) PCT No.: PCT/CN2014/089390
§ 371 (c)(1),
(2) Date: May 16, 2016

(87) PCT Pub. No.: WO2015/070695
PCT Pub. Date: May 21, 2015

(65) Prior Publication Data
US 2016/0299322 A1    Oct. 13, 2016

(30) Foreign Application Priority Data
Nov. 15, 2013  (CN) .......................... 2013 1 0569109

(51) Int. Cl.
*F21V 11/08* (2006.01)
*G02B 15/14* (2006.01)
(Continued)

(52) U.S. Cl.
CPC ............ *G02B 15/14* (2013.01); *F21V 11/186* (2013.01); *F21V 17/06* (2013.01); *F21V 17/104* (2013.01);
(Continued)

(58) Field of Classification Search
CPC .......... G02B 15/14; G02B 3/04; G02B 5/005; G02B 19/0019; G02B 19/0066;
(Continued)

(56) References Cited

U.S. PATENT DOCUMENTS 3,116,022 A * 12/1963 Davis ..................... F21V 5/008
                                                     362/268
4,232,359 A * 11/1980 Leon ...................... F21V 14/02
                                                     362/268
(Continued)

FOREIGN PATENT DOCUMENTS

CN      36104591 A     4/1987
CN      201547566 U    8/2010
(Continued)

OTHER PUBLICATIONS

International Search Report for PCT/CN2014/089390 dated Feb. 4, 2015.

*Primary Examiner* — Y M. Lee
(74) *Attorney, Agent, or Firm* — JCIPRNET

(57) ABSTRACT

An optical system of LED variable-focus imaging lamp, comprises a LED light source module, a light-collecting assembly, a shutter assembly and a zoom lens assembly, which are installed in sequence according to the direction of a light path. Geometry centers of the module and assemblies are collinear with a primary optic axis A. A focal point F1 of the light-collecting assembly coincides with a focal point F2 of the zoom lens assembly. The zoom lens assembly comprises a first zoom lens, a diaphragm and a second zoom lens. The first zoom lens and the second zoom lens can move forward or backward along the direction of the primary optic axis A so that zoom is realized. The diaphragm is disposed between the first zoom lens and the second zoom lens, and the clear aperture of which is adjustable.

10 Claims, 5 Drawing Sheets

(51) Int. Cl.
*G02B 19/00* (2006.01)
*F21V 11/18* (2006.01)
*F21V 17/06* (2006.01)
*F21V 17/10* (2006.01)
*G02B 26/04* (2006.01)
*F21Y 115/10* (2016.01)
*F21W 131/406* (2006.01)

(52) U.S. Cl.
CPC ..... *G02B 19/0019* (2013.01); *G02B 19/0066* (2013.01); *G02B 26/04* (2013.01); *F21W 2131/406* (2013.01); *F21Y 2115/10* (2016.08)

(58) Field of Classification Search
CPC .... G02B 26/04; G02B 15/161; G02B 15/155; G02B 15/163; F21V 11/186; F21V 17/06; F21V 17/104; F21V 11/08; F21W 2131/406
See application file for complete search history.

(56) References Cited

U.S. PATENT DOCUMENTS

| | | | | |
|---|---|---|---|---|
| 4,338,654 | A | * | 7/1982 | Logothetis ............... F21S 8/00 362/268 |
| 4,745,531 | A | | 5/1988 | Leclercq |
| 2012/0310047 | A1 | * | 12/2012 | Kasamatsu .......... A61B 1/0638 600/178 |
| 2014/0300803 | A1 | * | 10/2014 | Tsai ...................... G02B 15/16 348/360 |

FOREIGN PATENT DOCUMENTS

| | | |
|---|---|---|
| CN | 202118791 U | 1/2012 |
| CN | 102798087 A | 11/2012 |
| CN | 103631017 A | 3/2014 |
| CN | 203561795 U | 4/2014 |
| WO | 2015070695 A1 | 5/2015 |

* cited by examiner

OPTICAL SYSTEM OF LED VARIABLE-FOCUS IMAGING LAMP

CROSS-REFERENCE TO RELATED APPLICATIONS

The present application is a national phase entry under 35 U.S.C § 371 of International Application No. PCT/CN2014/089390 filed Oct. 24, 2014, which claims priority from Chinese Application No. 201310569109.2 filed Nov. 15, 2013, all of which are hereby incorporated herein by reference.

TECHNICAL FIELD

The present invention relates to an optical system of LED variable-focus imaging lamp, which belongs to the innovative technology of the imaging optical system of LED imaging lamp.

BACKGROUND

The existing stage imaging lamps are classified into halogen light source imaging lamps and LED imaging lamps according to the light sources. However, the halogen light source imaging lamp of the prior art is high in the whole lamp's heat, low in lighting efficiency, and the adjustments of the light intensity and the color temperature of which fail to be achieved. To overcome the above defects of the halogen lamp, insiders in the industry have developed an imaging lamp using LED as light source. LED lamps have been widely used in various places of entertainment due to the advantages, such as energy conservation, environmental protection, high lighting efficiency, high brightness, long working life, strong controllability, etc. In order to reduce cost and to achieve fittings sharing between LED imaging lamp and the existing imaging lamp using halogen bulb as light source, the diameter of the light spot of the focal point F of the imaging lamp is required to be between 60~80 mm, which causes notable difficulty to the later lens design, so that many enterprises have to abandon the zoom system. Although a few enterprises have designed the zoom system, the clarity of the patterns in the zoom process is not enough to meet the usage requirements.

SUMMARY OF THE PRESENT INVENTION

The object of the present invention is to take the above-described problem into consideration and to provide an optical system of LED variable-focus imaging lamp that enables imaging to be clearer in the case that zoom is realized. The present invention designs a unique zoom lens assembly to realize the zoom function, which overcomes the technical difficulties of the optical design and possesses an imaging effect comparable to that of the prime lens.

The technical solutions of the present invention is that: an optical system of LED variable-focus imaging lamp of the present invention, comprises a LED light source module, a light-collecting assembly, a shutter assembly and a zoom lens assembly, which are installed in sequence according to the direction of a light path. Geometry centers of the module and assemblies are collinear with a primary optic axis A. A focal point F1 of said light-collecting assembly coincides with a focal point F2 of the zoom lens assembly. Said zoom lens assembly comprises a first zoom lens, a diaphragm and a second zoom lens. Said first zoom lens and second zoom lens move forward or backward along the direction of the primary optic axis A so that zoom is realized. Said diaphragm is disposed between the first zoom lens and the second zoom lens, and the clear aperture of which is adjustable.

Said shutter assembly comprises four shutter blades, a plurality of separating plates, a plurality of limiting strips, a shutter frame, a pressing plate and resilient elements. Four shutter blades are mounted on the shutter frame as an assembly, forming a multi-layer shutter structure. The layers are respectively separated off through the separating plates. The shutter frame is provided with the limiting strips at positions corresponding to outer sides of the shutter blades. The limiting strips prevent the shutter blades from leaving the shutter frame during movement. The shutter blades and the separating plates are fixed on the shutter frame through the pressing plate and the resilient elements.

Said four shutter blades form a two-layer shutter structure, with every two shutter blades being arranged in the same plane; or form a four-layer shutter structure, with each of the shutter blades being arranged in different planes respectively; or form a three-layer shutter structure, with two of the shutter blades being arranged in the same plane and the other two being arranged in different planes respectively, and the layers are separated off through the separating plates.

In the present invention, an incident plane of the first zoom lens of the zoom lens assembly adopts an aspheric structure. Its superficial radian is different from that of the ordinary spherical lens, so that the aberration may be well corrected. The diaphragm is an iris diaphragm with adjustable clear aperture, i.e. a vignetting diaphragm. This kind of diaphragm may reduce the off-axis aberration, so that the light beam from the off-axis point at the GOBO pattern, which could pass through the optical system, can only pass through partially. The off-axis stray light passing through is decrease, making the imaging clearer. In the stage imaging lamps, the present invention is the first invention to apply the aperture diaphragm to the zoom system of the imaging lamp, achieving advantages that the imaging is clearer and sharper. The problem to be solved in the present invention is, to design an optical system of variable-focus imaging on the basis of using LED module as light source and on the premise of achieving fittings sharing with the existing imaging lamp, with the zoom range continuously adjustable between 16°~30°, which can substitute for a plurality of the existing fixed focus imaging lamps. The present invention provides an optical system of LED variable-focus imaging lamp which is smartly designed, has good performance and is practical and convenient.

DETAILED DESCRIPTION OF THE PREFERRED EMBODIMENT

Embodiment

Figure 1:
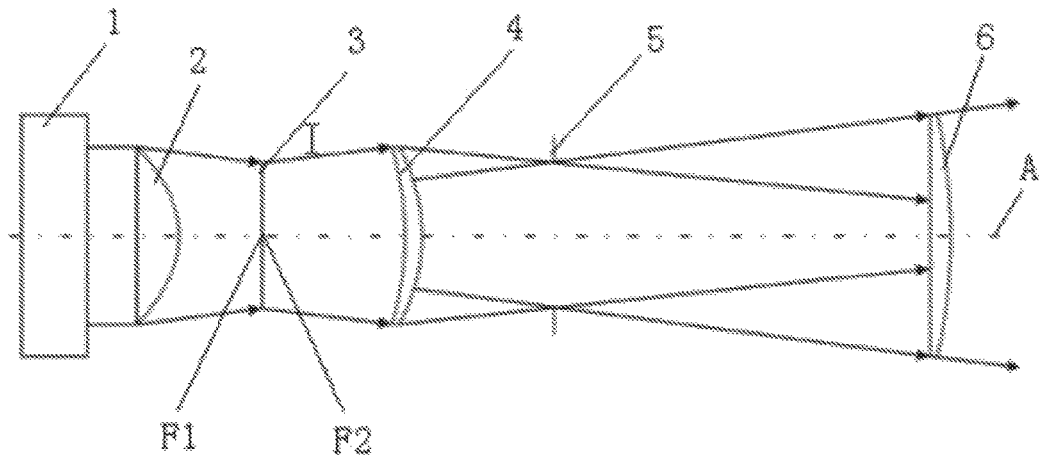
FIG. 1 is a schematic view of the light path of the smallest light spot according to the present invention.
Figure 2:
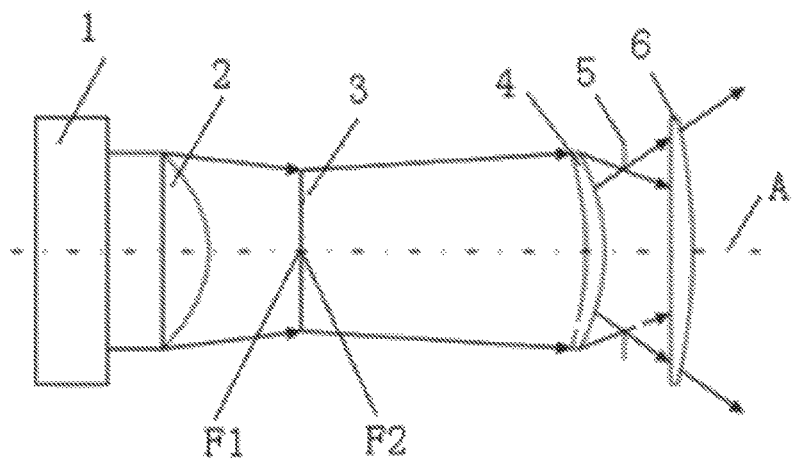
FIG. 2 is a schematic view of the light path of the largest light spot according to the present invention.
Figure 3:
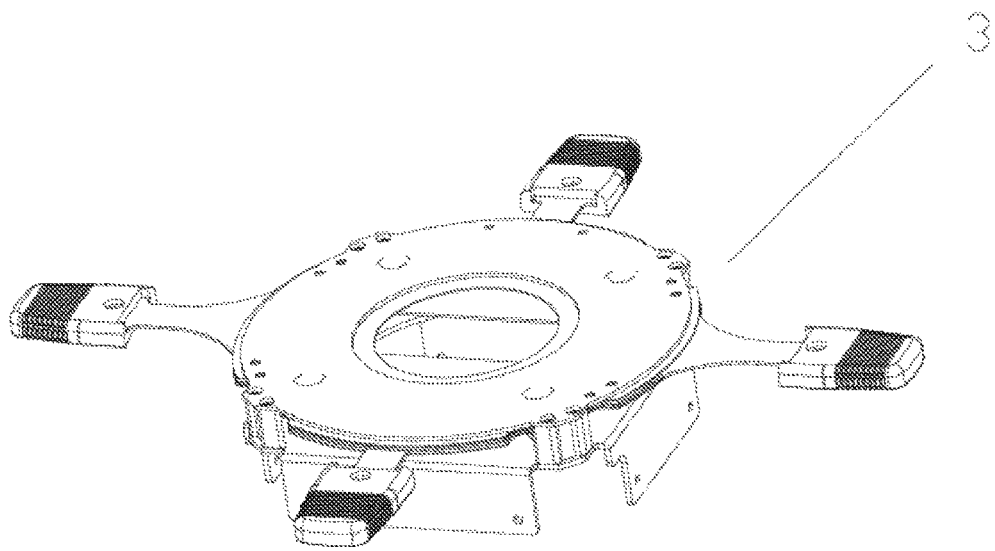
FIG. 3 is a stereogram of the shutter assembly according to the present invention.
Figure 4:
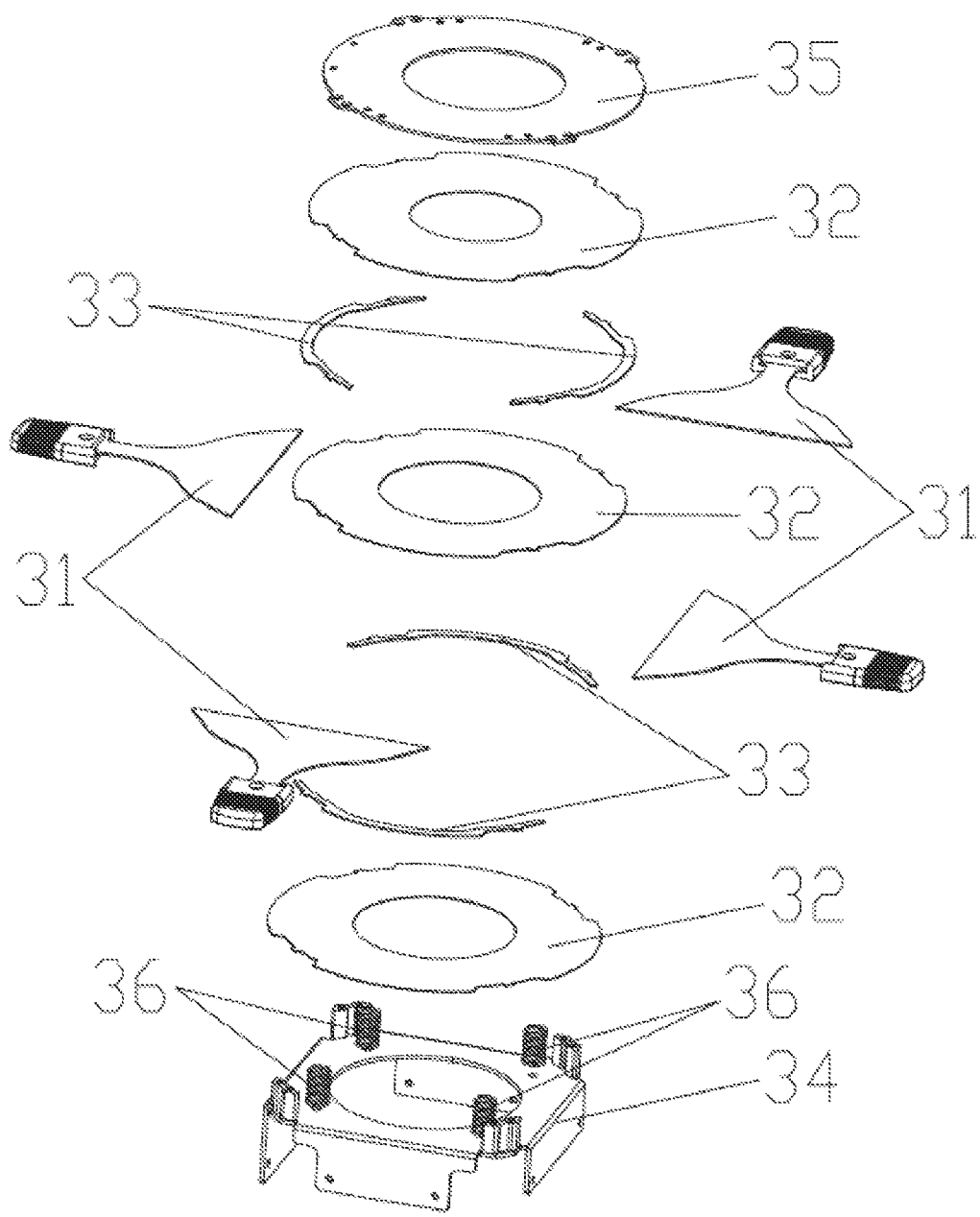
FIG. 4 is an exploded view of the shutter assembly according to the present invention.
Figure 5:
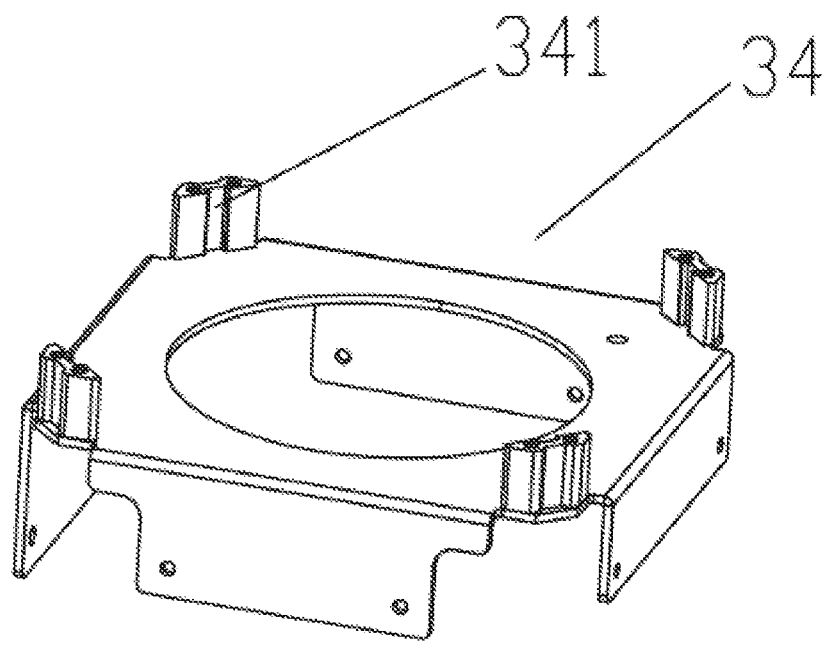
FIG. 5 is a stereogram of the shutter frame according to the present invention.
Figure 6:
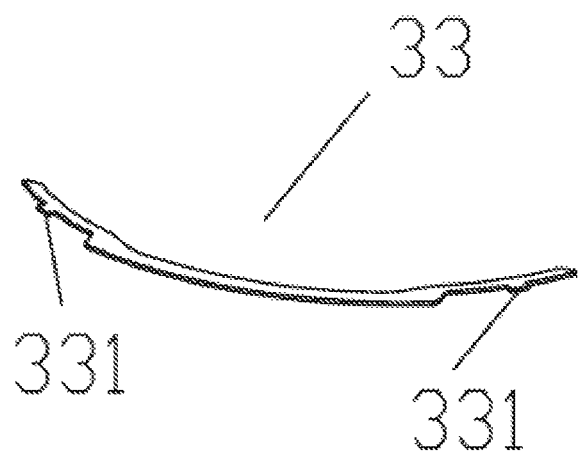
FIG. 6 is a stereogram of the limiting strips according to the present invention.

As shown in FIG. 1 and FIG. 2, an optical system of LED variable-focus imaging lamp of the present invention, comprises a LED light source module 1, a light-collecting assembly 2, a shutter assembly 3 and a zoom lens assembly, which are installed in sequence according to the direction of a light path. Geometry centers of the module and assemblies are collinear with a primary optic axis A. A focal point F1 of the light-collecting assembly 2 coincides with a focal point F2 of the zoom lens assembly. The zoom lens assembly comprises a first zoom lens 4, a diaphragm 5 and a second zoom lens 6. The first zoom lens 4 and the second zoom lens 6 move forward or backward along the direction of the primary optic axis A so that zoom is realized. The diaphragm 5 is disposed between the first zoom lens 4 and the second zoom lens 6, and the clear aperture of which is adjustable.

The zoom range of the zoom lens assembly is continuously adjustable between 16°~30°.

An incident plane of the first zoom lens 4 is aspheric, the curvature radius of an exit plane is 220~230 mm, the thickness of a central axis of the lens is 8~15 mm, and the effective diameter of the lens is 80~88 mm.

The incident plane of the first zoom lens 4 adopts an aspheric structure. Its superficial radian is different from that of the ordinary spherical lens, so that the aberration may be well corrected. Due to the quantitative restriction of the lenses of the imaging lamp, adopting the aspheric structure may greatly reduce the quantity of the lenses, and a zoom system with higher magnification may be obtained at the same time. The optical system adopting aspheric technical design, may eliminate the spherical aberration, coma aberration, astigmatism and curvature of field, and may reduce the loss of the light energy, so that high-quality image effect and high-quality optical properties are obtained. In the present embodiment, the curvature radius of the exit plane of the first zoom lens 4 is 222.2 mm, the thickness of the lens is 10 mm, and the diameter of the lens is 85 mm.

The second zoom lens 6 is a spherical lens. Its curvature radius of an incident plane is 1990~2010 mm, the curvature radius of an exit plane is 280~290 mm, the thickness of a central axis of the lens is 8~15 mm, and the effective diameter of the lens is 110~120 mm.

Figure 7:
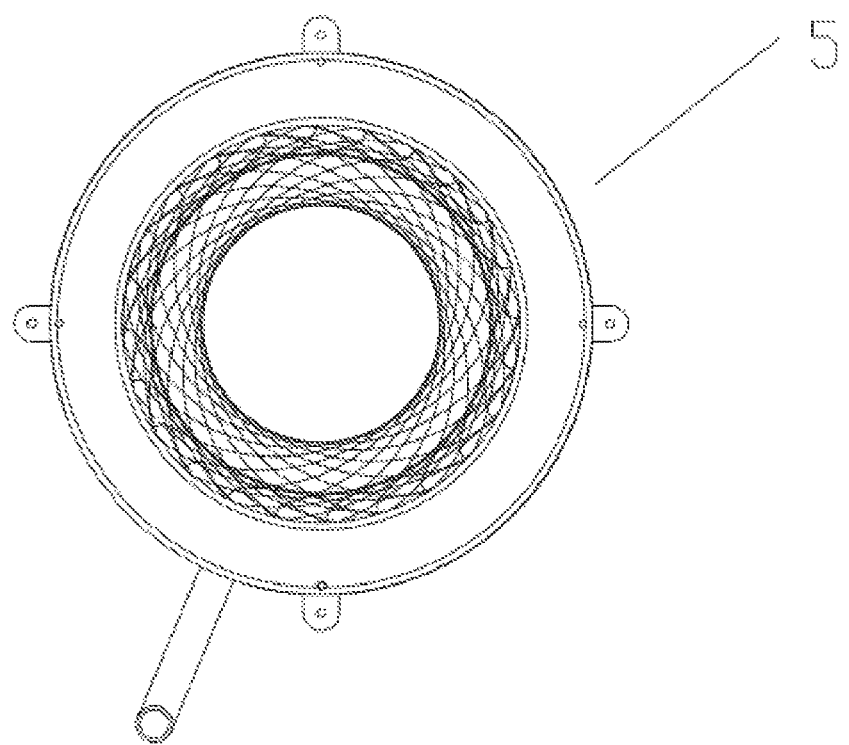
FIG. 7 is a stereogram of the diaphragm according to the present invention.

As shown in FIG. 7, the clear aperture of the diaphragm 5 is continuously adjustable from 0 mm to 110 mm.

The distance from the diaphragm 5 to the focal point F1 of the light-collecting assembly 2 and the focal point F2 of the zoom lens assembly along the primary optic axis is 135~150 mm.

The shutter assembly 3 is disposed at the position of the focal point F1 of the light-collecting assembly 2 or the nearby position adjacent to F1.

The power of the LED light source module 1 adopted in the present invention is 250 W. Encapsulated by high-power LED chips, its maximum luminous flux of the white light may attain over 11000 lm, the linear adjustable function of the color temperature in the range of 2800K-6500K is achieved at the same time, and the color rendering index of the light source may attain over 90. At present, the color rendering indexes of the lamps using LED as light source are all relatively low, which depends on the optical properties of LED itself. The spectra from LED is discontinuous, so the emitted light will be lacking in some spectral components, leading to low color rendering index of light source and low revivification degree of imaging. Comparing with the lamps using LED as light source, the present invention has great advantages and possesses properties of high brightness and high color rendering at the same time.

As shown in FIG. 3 to FIG. 6, the shutter assembly 3 comprises four shutter blades 31, a plurality of separating plates 32, a plurality of limiting strips 33, a shutter frame 34, a pressing plate 35 and resilient elements 36. Four shutter blades 31 are mounted on the shutter frame 34 as an assembly, forming a multi-layer shutter structure. The layers are respectively separated off through the separating plates 32. The shutter frame 34 is provided with the limiting strips 33 at positions corresponding to outer sides of the shutter blades 31. The limiting strips 33 prevent the shutter blades from leaving the shutter frame 34 during movement. The shutter blades 31 and the separating plates 32 are fixed on the shutter frame 34 through the pressing plate 35 and the resilient elements 36.

The limiting strips 33 are embedded in flanges or grooves 341 disposed at the shutter frame 34 through grooves or flanges 331.

Four shutter blades 31 form a two-layer shutter structure, with every two shutter blades being arranged in the same plane; or form a four-layer shutter structure, with each of the shutter blades being arranged in different planes respectively, which occupies more space and costs more, but could be controlled most flexibly; or form a three-layer shutter structure, with two of the shutter blades being arranged in the same plane and the other two being arranged in different planes respectively, and the layers are separated off through the separating plates. In the present embodiment, the three-layer shutter structure is adopted.

In the present embodiment, in order to achieve sharing with fittings of imaging lamps common in the market, such as pattern frame, diaphragm and etc, for the convenience of customers to replace in time, the diameter of the clear aperture at the position of the focal point F1 of the light-collecting assembly 2 is designed as 70 mm. The diameter of the clear aperture decides the difficulty and complexity of the lens design. The exit angle of the light at the focal point is about 46°. An optical system is designed as with large aperture and large field of view.

After passing through the first zoom lens 4, light beam passes the diaphragm 5, i.e. the vignetting diaphragm, and the variation range of the clear aperture of which is continuously adjustable from 0 mm to 110 mm. The vignetting diaphragm may intercept the light beam from the off-axis point, making its aperture angle less than the aperture angle of the on-axis object, which may improve the imaging quality of the off-axis point. In achieving the zoom range from 16° to 30°, the diameter of the vignetting diaphragm may be adjusted, and the imaging effect of the light beam from the off-axis point is controlled. On the premise that the imaging meets the clearness to the greatest extent, the luminous flux attains as high as possible. On the occasion that the requirement of the imaging is not high, the diameter of the diaphragm may be adjusted to the max, to achieve high-output luminous flux.

After passing the diaphragm 5, the light beam passes through the second zoom lens 6. In the present embodiment, the curvature radius of an incident plane of the second zoom lens 6 is 2000 mm, the curvature radius of an exit plane is 285.7 mm, the distance from the incident plane of the lens to the exit plane is 10 mm, and the diameter of the lens is 116 mm.

The optical system of the present invention, may achieve the adjustment of the exit angle from 16° to 30°. The output luminous flux of the whole lamp at the minimum exit angle may attain over 9500 lm, while the output luminous flux of the whole lamp may attain over 7500 lm. At the same time, the color temperature being adjustable in the range of 2800K~6500K may be met and the requirement of the stage lamps on different occasions is met. The optical system may substitute for the existing and most commonly used fixed focus imaging lamps with any angle between 16° and 30°.

What is claimed:

1. An optical system of LED variable-focus imaging lamp, comprising:
    an LED light source module;
    a light-collecting assembly;
    a shutter assembly; and
    a zoom lens assembly,
which are installed in sequence according to the direction of a light path, geometry centers of the module and assemblies being collinear with a primary optic axis A, a focal point F1 of said light-collecting assembly coinciding with a focal point F2 of the zoom lens assembly, wherein said zoom lens assembly comprises:
    a first zoom lens;
    a diaphragm; and
    a second zoom lens,
wherein said first zoom lens and the second zoom lens move forward or backward along the direction of the primary optic axis A so that zoom is realized, said diaphragm is disposed between the first zoom lens and the second zoom lens, and a clear aperture of which is adjustable.

2. The optical system of LED variable-focus imaging lamp according to claim 1, wherein the zoom range of said zoom lens assembly is continuously adjustable between 16°~30°.

3. The optical system of LED variable-focus imaging lamp according to claim 1, wherein an incident plane of said first zoom lens is aspheric, the curvature radius of an exit plane is 220~230 mm, the thickness of a central axis of the lens is 8~15 mm, and the effective diameter of the lens is 80~88 mm.

4. The optical system of LED variable-focus imaging lamp according to claim 1, wherein said second zoom lens is a spherical lens, the curvature radius of an incident plane of which is 1990~2010 mm, the curvature radius of an exit plane is 280~290 mm, the thickness of a central axis of the lens is 8~15 mm, and the effective diameter of the lens is 110~120 mm.

5. The optical system of LED variable-focus imaging lamp according to claim 1, wherein the clear aperture of said diaphragm is continuously adjustable from 0 mm to 110 mm.

6. The optical system of LED variable-focus imaging lamp according to claim 1, wherein the distance from said diaphragm to the focal point F1 of the light-collecting assembly along the primary optic axis is 135~150 mm.

7. The optical system of LED variable-focus imaging lamp according to claim 1, wherein said shutter assembly is disposed at the position of the focal point F1 of the light-collecting assembly or the nearby position adjacent to the focal point F1.

8. The optical system of LED variable-focus imaging lamp according to claim 7, wherein said shutter assembly comprises four shutter blades, a plurality of separating plates, a plurality of limiting strips, a shutter frame, a pressing plate and resilient elements, four shutter blades being mounted on the shutter frame as an assembly, forming a multi-layer shutter structure, the layers being respectively separated off through the separating plates, the shutter frame being provided with the limiting strips at positions corresponding to outer sides of the shutter blades, the limiting strips preventing the shutter blades from leaving the shutter frame during movement, and said shutter blades and the separating plates being fixed on the shutter frame through the pressing plate and the resilient elements.

9. The optical system of LED variable-focus imaging lamp according to claim 8, wherein said limiting strips are embedded in flanges or grooves disposed at the shutter frame through grooves or flanges.

10. The optical system of LED variable-focus imaging lamp according to claim 8, wherein said four shutter blades form a two-layer shutter structure, with every two shutter blades being arranged in the same plane; or form a four-layer shutter structure, with each of the shutter blades being arranged in different planes respectively; or form a three-layer shutter structure, with two of the shutter blades being arranged in the same plane and the other two being arranged in different planes respectively, and the layers are separated off through the separating plates.

* * * * *